United States Patent
Oates

(10) Patent No.: US 10,315,846 B2
(45) Date of Patent: *Jun. 11, 2019

(54) METHODS FOR STORING HYDROGEN IN A SALT CAVERN

(71) Applicant: PRAXAIR TECHNOLOGY, INC., Danbury, CT (US)

(72) Inventor: Rommel M. Oates, Spring, TX (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,977

(22) Filed: Oct. 27, 2015

(65) Prior Publication Data

US 2016/0046442 A1 Feb. 18, 2016

Related U.S. Application Data

(63) Continuation of application No. 14/182,582, filed on Feb. 18, 2014, now Pat. No. 9,284,120, which is a continuation of application No. 13/480,864, filed on May 25, 2012, now Pat. No. 8,690,476.

(51) Int. Cl.
  *B65G 5/00* (2006.01)
  *F17C 1/00* (2006.01)

(52) U.S. Cl.
  CPC ............... *B65G 5/00* (2013.01); *B65G 5/005* (2013.01); *F17C 1/007* (2013.01); *F17C 2203/0604* (2013.01); *F17C 2221/012* (2013.01); *F17C 2223/0123* (2013.01); *F17C 2223/036* (2013.01); *F17C 2227/0157* (2013.01); *F17C 2260/036* (2013.01); *F17C 2270/0152* (2013.01); *Y02E 60/321* (2013.01); *Y02E 60/322* (2013.01)

(58) Field of Classification Search
  CPC .................................. B65G 5/00; B65G 5/005
  See application file for complete search history.

(56) References Cited

U.S. PATENT DOCUMENTS

| | | |
|---|---|---|
| 2,878,165 A | 3/1959 | Cottle |
| 3,438,203 A | 4/1969 | Lamb et al. |
| 3,684,022 A | 8/1972 | Peterson |
| 3,807,181 A | 4/1974 | Kuhne |
| 4,025,321 A | 5/1977 | Anderson et al. |
| 4,117,684 A | 10/1978 | Hendrix |
| 4,183,369 A | 1/1980 | Thomas |

(Continued)

FOREIGN PATENT DOCUMENTS

| | | |
|---|---|---|
| JP | 58 191399 A | 11/1983 |
| WO | WO 02/097321 A1 | 12/2002 |

OTHER PUBLICATIONS

16 TEX. Admin. Code§ 3.97 (2007); Id. (1994).

(Continued)

*Primary Examiner* — Frederick L Lagman
(74) *Attorney, Agent, or Firm* — Nilay S. Dalal

(57) ABSTRACT

A novel method for storing high purity hydrogen into a salt cavern is provided. Particularly, the storage process involves confining the high purity hydrogen at a certain pressure in a salt cavern without seepage or leakage of the stored hydrogen through the salt cavern walls. The pressure in the cavern is maintained during storage of the high purity hydrogen.

8 Claims, 5 Drawing Sheets

(56) References Cited

U.S. PATENT DOCUMENTS

| | | | |
|---|---|---|---|
| 4,353,214 | A | 10/1982 | Gardner |
| 4,365,978 | A | 12/1982 | Scott |
| 4,444,727 | A | 4/1984 | Yanagihara |
| 4,577,999 | A | 3/1986 | Lindorfer et al. |
| 4,592,677 | A | 6/1986 | Washer |
| 4,626,131 | A | 12/1986 | Glew et al. |
| 4,725,381 | A | 2/1988 | Pinto |
| 4,830,056 | A | 5/1989 | Chamberlain |
| 5,511,905 | A | 4/1996 | Bishop et al. |
| 5,526,280 | A | 6/1996 | Consadori et al. |
| 5,669,734 | A | 9/1997 | Becnel, Jr. et al. |
| 5,842,519 | A | 12/1998 | Sydansk |
| 6,080,306 | A | 6/2000 | Falkner |
| 6,503,299 | B2 | 1/2003 | Baksh et al. |
| 6,511,528 | B1 | 1/2003 | Lansbarkis et al. |
| 6,576,138 | B2 | 6/2003 | Sateria et al. |
| 6,581,618 | B2 | 6/2003 | Hill et al. |
| 6,880,348 | B2 | 4/2005 | Bishop et al. |
| 7,078,011 | B2 | 7/2006 | Morrow et al. |
| 7,152,675 | B2 | 12/2006 | Heard |
| 7,438,079 | B2 | 10/2008 | Cohen et al. |
| 8,425,149 | B2 * | 4/2013 | Drnevich ................. B65G 5/00 405/52 |
| 8,690,476 | B2 * | 4/2014 | Oates ..................... B65G 5/005 405/54 |
| 8,757,926 | B2 | 6/2014 | Drnevich |
| 8,950,419 | B2 | 2/2015 | Oates et al. |
| 9,109,418 | B1 * | 8/2015 | Norris ..................... F16L 55/09 |
| 9,284,120 | B2 * | 3/2016 | Oates ..................... B65G 5/005 |
| 2004/0123738 | A1 | 7/2004 | Spencer |
| 2005/0220704 | A1 * | 10/2005 | Morrow ............. B01D 53/0462 423/658.3 |
| 2006/0150640 | A1 * | 7/2006 | Bishop .................... F17C 1/007 62/53.1 |
| 2006/0216811 | A1 | 9/2006 | Cunningham et al. |
| 2009/0010714 | A1 | 1/2009 | Bishop |
| 2009/0028644 | A1 | 1/2009 | Lourenco et al. |
| 2009/0184517 | A1 | 7/2009 | Mukai |
| 2009/0265292 | A1 | 10/2009 | Harper |
| 2010/0101789 | A1 | 4/2010 | Dickinson et al. |
| 2010/0163804 | A1 | 7/2010 | Schenck |
| 2010/0200229 | A1 | 8/2010 | Jefferd |
| 2011/0305515 | A1 | 12/2011 | Drnevich |
| 2012/0174569 | A1 * | 7/2012 | Ingersoll .................. F02C 6/16 60/327 |
| 2012/0259471 | A1 | 10/2012 | De Ridder |
| 2013/0213479 | A1 | 8/2013 | Oates et al. |
| 2013/0315669 | A1 | 11/2013 | Oates |
| 2013/0336721 | A1 * | 12/2013 | McBride ................. E21D 11/00 405/55 |
| 2014/0161533 | A1 | 6/2014 | Oates |
| 2014/0241802 | A1 | 8/2014 | Drnevich |
| 2015/0101672 | A1 | 4/2015 | Oates et al. |
| 2015/0185716 | A1 | 7/2015 | Wichmann et al. |
| 2016/0060038 | A1 | 3/2016 | Oates |
| 2016/0089705 | A1 | 3/2016 | Oates |

OTHER PUBLICATIONS

2006 International Pipeline Conference materials.
Adams, J., TransGas Limited "Natural Gas Salt Cavern Storage Operating Pressure Determination". Petroleum Society of CIM, Paper No. 97-180. Presented at Seventh Petroleum Conf. of S. Saskatchewan Section, the Petroleum Society of CIM (Oct. 19-22, 1997) 14 pages.
ASTM E534-91. "Standard Test Methods for Chemical Analysis of Sodium Chloride". (Published Oct. 1991) 122 pgs.
Bear, Jacob. "Dynamics of Fluids in Porous Media". American Elsevier Publishing Co., Inc. New York. (No date available). p. 136.
Bérest, P. et al. "Salt Permeability Testing—2001-8-SMRI-Part 1—The Influence of Permeability and Stress on Spherical Hollow Salt Samples". Solution Mining Research Inst. Research Project Report No. 20901-8-SMRI (Oct. 2001). 15 pgs.
Bérest, P. et al. "Salt Permeability Testing—2001-8-SMRI-Part 2—The Influence of Permeability and Stress on Spherical Hollow Salt Samples". Solution Mining Research Inst. Research Project Report No. 20901-8-SMRI (Oct. 2001). 11 pgs.
Breele, Y. et al. "Technico-Economic Study of Distributing Hydrogen for Automotive Vehicles"; International Journal of Hydrogen Energy, Elsevier Science Publishers B.V., Barking, GB, vol. 4, No. 4, Jan. 1, 1979, pp. 297-314, XP025578996, ISSN: 0360-3199, DOI: DOI:10.1016/0360-3199(79)90005-3 (retrieved on Jan. 1, 1979) p. 297-p. 299; Figure 2.
Brodsky, Nancy S. "Crack Closure and Healing Studies in WIPP Salt Using Compressional Wave Velocity and Attenuation Measurements: Test Methods and Results". Sandia National Laboratories, Contract No. 23-8484. SAND90-7076, (Printed Nov. 1990), 40 pgs.
Brouard et al. "Onset of Tensile Effective Stresses in Gas Storage Caverns". Solution Mining Research Institute, Fall 20907 Technical Meeting, Halifax, Canada (Oct. 8-10, 2007) 18 pgs.
Carter, et al. "Creep of Rocksalt". Elsevier Scientific Publishing Co., Amsterdam. Tectonophysics, 92 (1983) pp. 275-333.
CGA G-5.3:1997 Commodity Specification for Hydrogen, Fourth Edition, by Compressed Gas Association, Inc. ("CGA Spec").
Chevronphillips Hydrogen Cavern, Clemens Terminal, Slides (No date available). 15 slides.
Costin et al. "Creep Healing of Fractures in Rock Salt". Issued by Sandia National Laboratories, SAND80-0392, Published by National Technical Information Service, US Dept. of Commerce. (Sep. 29, 1980) 33 pgs.
CSA Standard Z341.1-06 "Reservoir Storage". Canadian Standards Assoc., (Dec. 2006) 44 pgs.
CSA Standard Z341.2-06 "Salt Cavern Storage". Canadian Standards Assoc., (Dec. 2006) 59 pgs.
CSA Standard Z341.Series 06 "Storage of Hydrocarbons in Underground Formations". Canadian Standards Assoc., (Dec. 2006) 17 pgs.
Durup, Jean Gérard. "Long-Term Tests for Tightness Evaluations with Brine and Gas in Salt (Field Test No. 2 with Gas)". Research Project Report No. 94-0002-S. SMRI Research and Development Project Report. Presented at 1994 Fall Meeting, Hannover, Germany, 36 pgs.
ERC Guide. "Natural Gas Storage in Salt Caverns—A Guide for State Regulators". Prepared by Energy Resources Committee of the Interstate Oil and Gas Compact Commission (Reprinted Feb. 1998). 68 pgs.
Evans, D.J. 2007. An appraisal of Underground Gas Storage technologies and incidents, for the development of risk assessment methodology. British Geological Survey Open Report, OR/07/023, 288 pgs..
Foh, Stephen et al. "Underground Hydrogen Storage Final Report". Institute of Gas Technology. Department of Energy and Environment, Brookhaven National Laboratory, Upton, NY, (Dec. 1979) 283 pgs.
Fuenkajorn et al. "Dilation-Induced Permability Increase Around Caverns in Salt". Rock Mechanics, Nelson & Laubach (eds)© 1994 Balkema, Rotterdam, ISBN 90 54 10 380 8, 8 pgs.
H2 Salt Dome Storage System PFD, Sep. 9, 2003 ("PFD").
Handbook of Compressed Gases (Van Nostrand Reinhold Company)—Hardcover (1990), by Compressed Gas Association, Compressed Gas Association Staff, 3rd ed., ISBN: 0442218818,ISBN-13: 9780442218812 ("CGA Handbook").
Hansen et al. "Elasticity and Strength of Ten Natural Rock Salts". First Conf. on Mechanical Behaviour of Salt. Pennsylvania State Univ. (Nov. 9-11, 1981).
Hydrogen Reliability Salt Cavern Case Study Oil Sands Heavy Oil Technologies Conference and Exhibition—Jul. 14-16, 2009, Alberta Canada, available at <http://www.slideshare.net/chojsm1/hydrogen-reliability-cavern-storage>; Published Jul. 20, 2009 ("Slides").
Investment in Gulf Coast to expand facilities and services, Oct. 25, 2007 <http://www.gasworld.com/investment-in-gulf-coast-to-expand-facilities-and-services/2146.article> (last visited Date).
Jacoby et al. "Salt Domes As a Source of Geothermal Energy". Mining Engineering (May 1974) pp. 34-39.
Johnson et al. "Salt Deposits in the United States and Regional Geologic Characteristics Important for Storage of Radioactive Waste".

(56) References Cited

OTHER PUBLICATIONS

Y/OWI/SUB—7414/1 DE 85 013319, Prepared for the Office of Waste Isolation, Union Carbide Corp., Nuclear Div., US Dept. of Energy (Mar. 1978). 191 pgs.
Kelley J.H., and R. Hagler Storage, transmission and distribution of Hydrogen, Int. J. Hydrogen Energ., 5, 35-54, 1980 ("Kelly").
Lord, Anna S. et al., "A Life Cycle Cost Analysis Framework for Geologic Storage of Hydrogen: A User's Tool", Sandia Report (SAND2011-6221) Sandia National Laboratories (Sep. 2011), 60 pges.
Mahoney J.J. and Strachan, D.M. "Reduction of Sulfate by Hyrogen in Natural Systems: A Literature Review", Pacific Northwest Laboratory, Richland, VA (Jan. 1987, Rev. Jan. 1988).
Marks' Standard Handbook for Mechanical Engineers, 9th Edition (1987) (pp. 7-18-7-19); Publisher: The McGraw-Hill Companies; ISBN: 007004127X; ISBN-13: 9780070041271.
Moss Bluff Storage Cavern, Operations and Maintenance Manual, Sep. 16, 2003 ("Ops Manual").
Mullaly, M A C. "Underground Storage in Thin Salt Layers on Teesside" Solution Mining Research Institute Meeting Paper presented in Manchester, UK (Oct. 1982) 10 pgs.
Nieland, JD. (2008). Salt cavern Thermodynamics-Comparison Between Hydrogen, Natural Gas and Air Storage. SMRI Fall Meeting, Austin, Texas, 215-234.
Oil and Gas Docket No. 03-0238823, Examiner's Report and Proposal for Decision, Jul. 28, 2004 ("Permit Review".
Performance of Palladium Diffusers for Reliable Purification; (2002) Extended abstract of a paper presented at CS-MAX, San Jose, CA, Nov. 11-13 (pp. 141-143). ("Funke").
Pfeifle et al. "Correlation of Chemical Mineralogic, and Physical Characteristics of Gulf Coast Dome Salt to Deformation and Strength Properties". Solution Mining Research Inst., Research Project Report #94-0004-S (Jan. 1995) 116 pgs.
Popp et al. "Evolution of Dilatancy and Permeability in Rock Salt During Hydrostatic Compaction and Triaxial Deformation". Journal of Geophysical Research, vol. 106, No. B3 (Mar. 10, 2001) pp. 4061-4078.
Pottier, J.D. et al. "Mass Storage of Hydrogen"; NATO ASI Series. Series E, Applied Sciences; Hydrogen Energy System: Production and Utilization of Hydrogen and Future Aspects; (Proceedings of the NATO Advanced Study Institute on Hydrogen Energy System, Utilization of Hydrogen and Future Aspects), vol. 295, Jan. 1, 1995, pp. 167-179, XP008139790, ISSN: 0168-132X, pp. 167-pp. 170; Figures 1-3, 8.
Praxair Commercializes Industry's Only Hydrogen Storage, Oct. 22, 2007 <http://www.praxair.com/news/2007/praxair-commercializes- industrys-only-hydrogen-storage> (last visited Date.
Praxair Extending Hydrogen Pipeline in Southeast Texas—Oil & Gas Journal, vol. 90(34) (1992) (Praxair pipeline.
Praxair Hydrogen salt cavern schematic from Praxair, Inc. Mechanical Integrity Test, Hydrogen Storage Cavern #1, Sabine Storage 7 Operations, Inc. Project 11-640, Jan. 10, 2012, p. 56 (Cavern Structure).
Praxair Hydrogen Storage Project, TRRC Hearing, Jun. 10, 2004 ("Permit Presentation").
Praxair, Inc. Mechanical Integrity Test, Hydrogen Storage Cavern#1, Sabine Storage 7 Operations, Inc. Project 11-640, Jan. 10, 2012 ("5YR MIT").
Prudential Equity Group Conference, Speaker: Stephen F. Angel, Executive Vice President, Sep. 22, 2005, <http://www.praxair.com/investor-relations/reports-filings- and- presentations/investor-presentations> (last visited Date).
Ratigan et al. "LPG Storage at Mont Belvieu, Texas: A Case History". SPE Advanced Technology Series, Reprinted from vol. 1, No. 1 (1993) pp. 204-209.
Ratigan et al. "Rock Mechanics Aspects of Natural Gas Storage in Domal Salt". Solution Mining Research Inst. Meeting Paper. Prepared for SMRI 1993 Fall Meeting, Lafayette, Louisiana (Oct. 25-26, 1993), 50 pgs.
Ratigan, Joe L. "Hydrogen Storage in Solution-Mined Caverns in Salt Domes". Presentation by Ratigan Engineering & Consulting LLC (No date available) 36 pgs.
Rezunenko et al. "Constructive and Operation of Rock-Salt Underground Helium Concentrate Storage", SMRI Fall Meeting (Oct. 3-6, 1999).
Stolten, Detlef, ed. Hydrogen and fuel cells: fundamentals, technologies and applications. John Wiley & Sons, 2010 ("Stolten").
Stormont et al. "Laboratory Study of Gas Permeability Changes in Rock Salt During Deformation". Int. J. Rock Mech. Sci. & Geomech. Abstract, vol. 29, No. 4 (1992) pp. 325-342.
Sutherland et al. "Argon Gas Permeability of New Mexico Rock Salt Under Hydrostatic Compression". Int. J. Rock Mech. Sci. & Geomech. Abstracts, vol. 17, Pergamon Press Ltd. (1980), pp. 281-288.
Tek, M. R. (1996). Natural gas underground storage: inventory and deliverability. PennWell Publishing. ISBN: 0878146148; ISBN-13:9780878146147 ("Tek").
Thoms et al. "Survey of Existing Caverns in U.S. Salt Domes". Solution Mining Research Institute Research Project No. 84-0002 (No date available) 47 pgs.
Thoms R. L. and Gehle, R.M. "A Brief History of Salt Cavern Use", Keynote Speech at Salt 2000 Conference (2000) no month.
USPTO Case IPR2015-01071, Patent Trial and Appeal Board Decision, Institution of Inter Partes Review, U.S. Pat. No. 7,078,011 B2.
USPTO Case IPR2015-01072, Patent Trial and Appeal Board Decision, Institution of Inter Partes Review, U.S. Pat. No. 7,078,011 B2.
USPTO Case IPR2015-01073, Patent Trial and Appeal Board Decision, Institution of Inter Partes Review, U.S. Pat. No. 7,078,011 B2.
USPTO Case IPR2015-01074, Patent Trial and Appeal Board Decision, Denying Institution of Inter Partes Review, U.S. Pat. No. 8,690,476 B2.
USPTO Case IPR2015-01075, Patent Trial and Appeal Board Decision, Denying Institution of Inter Partes Review, U.S. Pat. No. 8,690,476 B2.
Valenti, Richard M., Compressed Air Energy Storage (CAES) Act, KCC Rule Development, Kansas Corporation Commission, KCC Open Meeting, Issue 3—Final (Jun. 16, 2010) 49 pages.
Venter, R.D. et al; "Modelling of Stationary Bulk Hydrogen Storage Systems"; International Journal of Hydrogen Energy, Elsevier Sci8ence Publishers B.V., Barking, GB, vol. 22, No. 8, Aug. 1, 1997, pp. 791-798, XP004075354, ISSN: 0360-3199, DOI: DOI:10.1016/S0360-3199(96)00210-8, p. 791-pp. 793; Tables 1, 2.
IPR No. 2016-01079, filed May 20, 2016.
USPTO Case IPR No. 2015-01071, Patent Trial and Appeal Board Final Written Decision, U.S. Pat. No. 7,078,011 B2.
USPTO Case IPR No. 2015-01072, Patent Trial and Appeal Board Final Written Decision, U.S. Pat. No. 7,078,011 B2.
USPTO Case IPR No. 2015-01073, Patent Trial and Appeal Board Final Written Decision, U.S. Pat. No. 7,078,011 B2.
Ahmet Ozarslan: Large-Scale Hydrogen Energy Storage in Salt Caverns; International Journal of Hydrogen Energy., vol. 37, No. 19, Oct. 1, 2012, pp. 14265-14277, XP055345828, GB ISSN: 0360-3199, DOI: 10.1016/j.ijhydene.2012.07.111.
Ph. Boucly et al. Edited by Magnus Bergman: Subsurface Space Environment Protection Low Cost Storage Energy Savings; Proceedings of the International Symposium (Rockstore '80), Stockholm, Sweden, Jun. 23-27, 1980, vol. 1; Pergamon Press, pp. 251-257.
Heike Bernhardt et al.: New Developments in the Gas First Fill Process of Natural Gas Storage Caverns; Solution Mining Research Institute, Clarks Summit, PA; www.solutionmining.org; SMRI Fall 2011 Technical Conference; Oct. 3-4, 2011, York, United Kingdom; pp. 1-13, XP055372266.
Wolfgang Schreiner et al.: IfG Cavern Design Concept Rockmechanical aspects for the development and operation of rock salt caverns; Solution Mining Research Institute, Clarks Summit, PA; www.solutionmining.org; SMRI Fall 2010 Technical Conference; Oct. 3-6, 2010, Leipzig, Germany, pp. 1-15, XP055371971.

(56) References Cited

OTHER PUBLICATIONS

Fritz Crotogino et al.: Energy Storage in Salt Caverns/ Developments and Concrete Projects for Adiabatic Compressed Air and for Hydrogen Storage; Solution Mining Research Institute, Clarks Summit, PA; XP055372254, Retrieved from the Internet <URL:http://www.solutionmining.org>; SMRI Spring 2008 Technical Conference; Apr. 28-29, 2008, Porto, Portugal, pp. 1-12.

Peter Fritze et al.: Start-Up and Commissioning of an Underground Gas Storage Facility with Special Respect of the First Gas Filling of the Storage Caverns; Solution Mining Research Institute, Clarks Summit, PA; www.solutionmining.org; SMRI Spring 2002 Meeting; Apr. 28-May 1, 2002, Banff, Alberta, Canada, pp. 1-13, XP055372264.

Thomas Luschtinetz et al.: 14. Symposium- Nutzung Regenerativer Energiequellen Und Wasserstoff-Technik 2007; Energie-Symposium; Nov. 8-10, 2007; Fachhochschule Stralsund; University of Applied Sciences; ISBN 3-9809953-6-4; Article from same symposium by F. Crotogino et al.—Wasserstoff-Speicherung in Salzkavernen zur Glattung des Windstromangebots; KBB Underground Technologies GmbH, Monkhofer Weg, Lubeck, pp. 12-18, XP055371974, ISBN: 3-9809953-6-4.

Paul E. Nelson et al.: State-of-the-Art Review and New Techniques for Mechanical Integrity Tests of (Gas-Filled) Natural Gas Storage Caverns; Solution Mining Research Institute, Encinitas, California; www.solutionmining.org; SMRI Jun. 2003; RESPEC, Rapid City, South Dakota; Research Project Report Feb. 2003, pp. 1-92, XP055372295.

Tommy L. Smith et al.: Methods for a Parametric Study of a Proposed Gas Storage Cavern Development in Salt; Solution Mining Research Institute, Clarks Summit, PA; www.solutionmining.org; SMRI Fall 2007 Technical conference; Oct. 8-9, 2007, Halifax, Nova Scotia, Canada, pp. 1-32, XP055372301.

Tatchell, J. A. et al.: "Journees Internationales D'Etude Sur L'Hydrogene ET SES Perspectives", Nov. 1976, article "Hydrogen in the Chemical Industry", pp. 1-17, XP055371965.

Svein B. Thaule et al.: Experience with Thermophysical Modelling of Gas Cavern Operations in Etzel; Solution Mining Research Institute, Deerfield, IL; bdiamond@mcs.com; SMRI Fall Meeting 1994; Hannover, Germany, pp. 1-13, XP055372299.

K.D. Williamson, Jr. et al.: Recent Developments in Hydrogen Technology; Los Alamos National Laboratory; Los Alamos, New Mexico; vol. II; TP359.HER43 1986 665.8'1; Library of Congress Card No. 84-29360; ISBN 0-8493-5126-X(v.1); ISBN 0-8493-5127-8 (v.2); Nov. 7, 1984; pp. 1-8, XP055372243.

J.D. Pottier et al; Mass Storage of Hydrogen now edited by Yuda Yurum; and retitled Hydrogen Energy System Production and Utilization of Hydrogen and Future Aspects; Kluwer Academic Publishers; with NATO Scientific Affairs Division; Department of Chemistry; Hacettepe University; Ankara, Turkey; NATO ASI Series; Series E: Applied Sciences—vol. 295; ISBN 0-7923-3601-1; Aug. 21-Sep. 3, 1994.

Underground Storage; British Geological Survey; 2008, pp. 22, XP055372252, retrieved from the internet <URL:https://www.bgs.ac.uk/downloads/start.cfm?id_1370>.

Solution Mining Research Institute; SMRI DMLCO website content Feb. 11, 2010, Section 6, Research Archive DMLCO, XP055372261; <URL:http://www.solutionmining.org>.

Tatchell, J. A.: "Hydrogen in the Chemical Industry.", AIM Conference Proceedings L'Hydrogene ET SES Perspectives., Nov. 15, 1976 (Nov. 15, 1976), Liege, Belgium, XP055371965.

Hardy et al.: "The Mechanical Behavior of Salt", Proceedings of the First Conference, Series of Rock and Soil Mechanics, vol. 9, 1981, pp. 1-21, XP055372269, ISBN: 0-87849-145-0.

Opposition I by Storengy, P.O. Box CS 70001, Batiment Djinn, 12 Rue Raoul Nordling, 92270 Bois-Colombes, France—filed Apr. 5, 2017—in EP 2855306.

Opposition II by EnergyStock B.V., P.O. Box 364, 9700 Aj Groningen, Netherlands; filed Apr. 6, 2017 in EP 2855306.

Dpposition III by L'Air Liquide, Societe Anonyme pour I'Etude et I'Exploitation des Procedes George Claude, 75, quai d'Orsay 75007 Paris, France; filed on Apr. 7, 2017 in EP 2855306.

Dpposition IV by Innogy Gas Storage NWE GmbH, Flamingoweg 1, 44139 Dortmund, Deutschland; filed Apr. 10, 2017 in EP2855306.

* cited by examiner

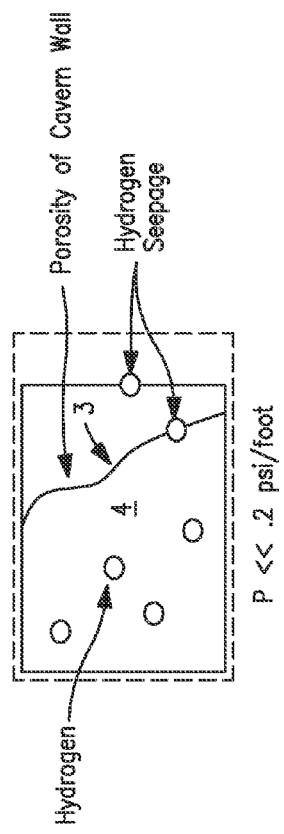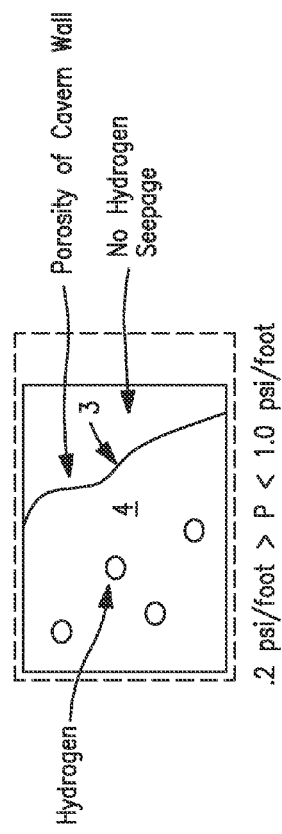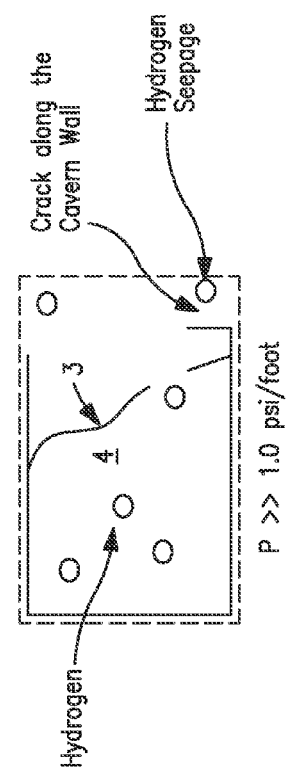

US 10,315,846 B2

METHODS FOR STORING HYDROGEN IN A SALT CAVERN

RELATED APPLICATIONS

This application is a continuation of U.S. application Ser. No. 14/182,582, which is a continuation-in-part of U.S. Pat. No. 8,690,476, filed on May 25, 2012, each of which is hereby incorporated by reference in its entirety.

FIELD OF THE INVENTION

The present invention relates to a novel method for storing high purity hydrogen into a salt cavern. Particularly, the storage process involves storing high purity hydrogen into a salt cavern without seepage of the stored hydrogen across or through the walls of the salt cavern.

BACKGROUND OF THE INVENTION

Hydrogen is supplied to customers connected to a hydrogen pipeline system. Typically, the hydrogen is manufactured by steam methane reforming in which a hydrocarbon and steam are reacted at high temperature in order to produce a synthesis gas containing hydrogen and carbon monoxide. Hydrogen is separated from the synthesis gas to produce a hydrogen product stream that is introduced into the pipeline system for distribution to customers that are connected to the pipeline system. Alternatively, hydrogen produced from the partial oxidation of a hydrocarbon can be recovered from a hydrogen rich stream. Typically, hydrogen is supplied to customers under agreements that require availability and on stream times for the steam methane reformer or hydrogen recovery plant. When a steam methane reformer is taken off-line for unplanned or extended maintenance, the result could be a violation of such agreements. Additionally, there are instances in which customer demand can exceed hydrogen production capacity of existing plants. Having a storage facility to supply back-up hydrogen to the pipeline supply is therefore desirable in connection with hydrogen pipeline operations. Considering that hydrogen production plants on average have production capacities that are roughly 50 million standard cubic feet per day or greater, a storage facility for hydrogen that would allow a plant to be taken off-line, to be effective, would need to have storage capacity in the order of 1 billion standard cubic feet or greater.

The large storage capacity can be met by means of salt caverns to store the hydrogen underground. Low purity grades of hydrogen (i.e., below 95% purity) as well as other gases have been stored in salt caverns. Salt caverns are large underground voids that are formed by adding fresh water to the underground salt, thus creating brine, which is often referred to as solution mining. Caverns are common in the gulf states of the United States where demand for hydrogen is particularly high. Such hydrogen storage has taken place where there are no purity requirements or less stringent (<96% pure) requirements placed upon the hydrogen product. In such case, the stored hydrogen from the salt cavern is simply removed from the salt cavern without further processing.

High purity (e.g., 99.99%) hydrogen storage within salt caverns presents several challenges. For example, storing large quantities (e.g., greater than 100 million standard cubic feet) of pure (e.g., 99.99%) gaseous hydrogen in underground salt caverns consisting of a minimum salt purity of 75% halite (NaCl) or greater without measurable losses of the stored hydrogen is difficult based on the properties of hydrogen. Hydrogen is the smallest and lightest element within the periodic table of elements, having an atomic radius measuring 25 pm+/−5 pm. Further, hydrogen is flammable, and therefore a very dangerous chemical if not handled properly. Salt caverns consist of salt walls that have various ranges of permeability (e.g., 0-23×10^-6 Darcy) that if not controlled properly could easily allow gaseous hydrogen to permeate through the salt walls and escape to the surface of the formation. If the stored hydrogen within an underground salt formation was to escape and permeate through the salt formation to the surface, a dangerous situation could arise with fatality potential or immense structural damage potential. Consequently, high purity hydrogen is typically considered one of the most difficult elements to contain within underground salt formations.

As will be discussed, among other advantages of the present invention, an improved method and system for storing hydrogen in a salt cavern is disclosed.

SUMMARY OF THE INVENTION

The invention relates, in part, to a method and system for storing high purity hydrogen into a salt cavern. The cavern pressure has been found to affect the ability to form a leak-tight cavern not susceptible to hydrogen leakage. It has been found that maintaining the cavern pressure within a specific pressure range improves the structural integrity of the salt cavern. The method and system for storage as will be explained below is capable of storing high purity hydrogen without detection of substantial seepage through the salt cavern. The storage process is conducive for the storage of hydrogen having purity levels from at least 95% up to about 99.999% or greater.

In a first aspect, a method for storing hydrogen product in a salt cavern is provided. Hydrogen product is removed from a hydrogen pipeline. The hydrogen product is compressed to produce a compressed hydrogen product. The compressed hydrogen product is introduced into the salt cavern to produce stored hydrogen within the salt cavern. A substantially impermeable permeation barrier is created to the stored hydrogen along at least a portion of the walls of the salt cavern by storing the stored hydrogen at a pressure that is between a predetermined lower limit and a predetermined upper limit.

In a second aspect, a method for improved confinement of stored hydrogen within a substantially impermeable permeation barrier of a salt cavern is provided. Hydrogen product is removed from a hydrogen pipeline. The hydrogen product is compressed to produce a compressed hydrogen product. The cooling rate of an after cooler situated downstream of a compressor is regulated to manipulate a heat of compression within the compressed hydrogen product. The compressed hydrogen product is introduced through a well casing extending into the salt cavern. At least a portion of the heat of compression is transferred from the compressed hydrogen product to the well casing. The temperature of the well casing is increased by the transfer of heat from the compressed hydrogen product to increase the ductility of the casing and suppress the onset of hydrogen embrittlement along the casing, thereby maintaining a seal between the casing and the cavern to improve confinement of the stored hydrogen. The compressed hydrogen product from the casing is introduced into the salt cavern to produce stored hydrogen within the salt cavern at a pressure between a predetermined lower limit and predetermined upper limit. A substantially impermeable permeation barrier to the stored hydrogen is created along at least a portion of the walls of the salt cavern by storing the stored hydrogen at a pressure that is between a predetermined lower limit and a predetermined upper limit.

In a third aspect, a method for maintaining a substantially impermeable permeation barrier in a salt cavern contained a stored gas is provided. A substantial portion of the stored gas from the salt cavern is withdrawn to a level at which a pressure of the remaining portion of the stored hydrogen is reduced below a predetermined lower limit. A sufficient amount of compressed fluid is introduced into the salt cavern to reduce an effective volume of the salt cavern and pressurize the remaining portion of the stored gas to increase the pressure above the predetermined lower limit. A substantially impermeable permeation barrier to the stored gas at the pressure above the predetermined lower limit is created along at least a portion of the walls of the salt cavern.

In a fourth aspect, a method for storing hydrogen product in a salt cavern is provided. Hydrogen product is removed from a hydrogen source. The hydrogen product is introduced into the salt cavern to produce stored hydrogen within the salt cavern. The seepage of the stored hydrogen is reduced through walls of the salt cavern by maintaining the stored hydrogen at a pressure between a predetermined lower limit and a predetermined upper limit, thereby creating a substantially impermeable permeation barrier to the stored hydrogen along at least a portion of the walls of the salt cavern.

In a fifth aspect, an underground hydrogen storage cavern is provided. The cavern is formed by solution mining an underground salt formation to form a cavity defined by the salt walls and filling the cavity with a compressed hydrogen gas. The salt cavern has been modified to include a substantially impermeable permeation barrier to stored hydrogen within the storage cavern along at least a portion of the walls.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein:

FIG. 4a shows a salt cavern wall containing stored hydrogen at a pressure below a lower limit in which hydrogen seepage across the salt cavern occurs;

FIG. 4b shows a salt cavern wall containing stored hydrogen at a pressure within the pressure threshold limits so as to form a substantially impermeable permeation barrier in accordance with the principles of the present invention;

FIG. 4c shows a salt cavern wall containing stored hydrogen at a pressure above the upper limit in which hydrogen leakage occurs;

DETAILED DESCRIPTION OF THE INVENTION

Figure 1:
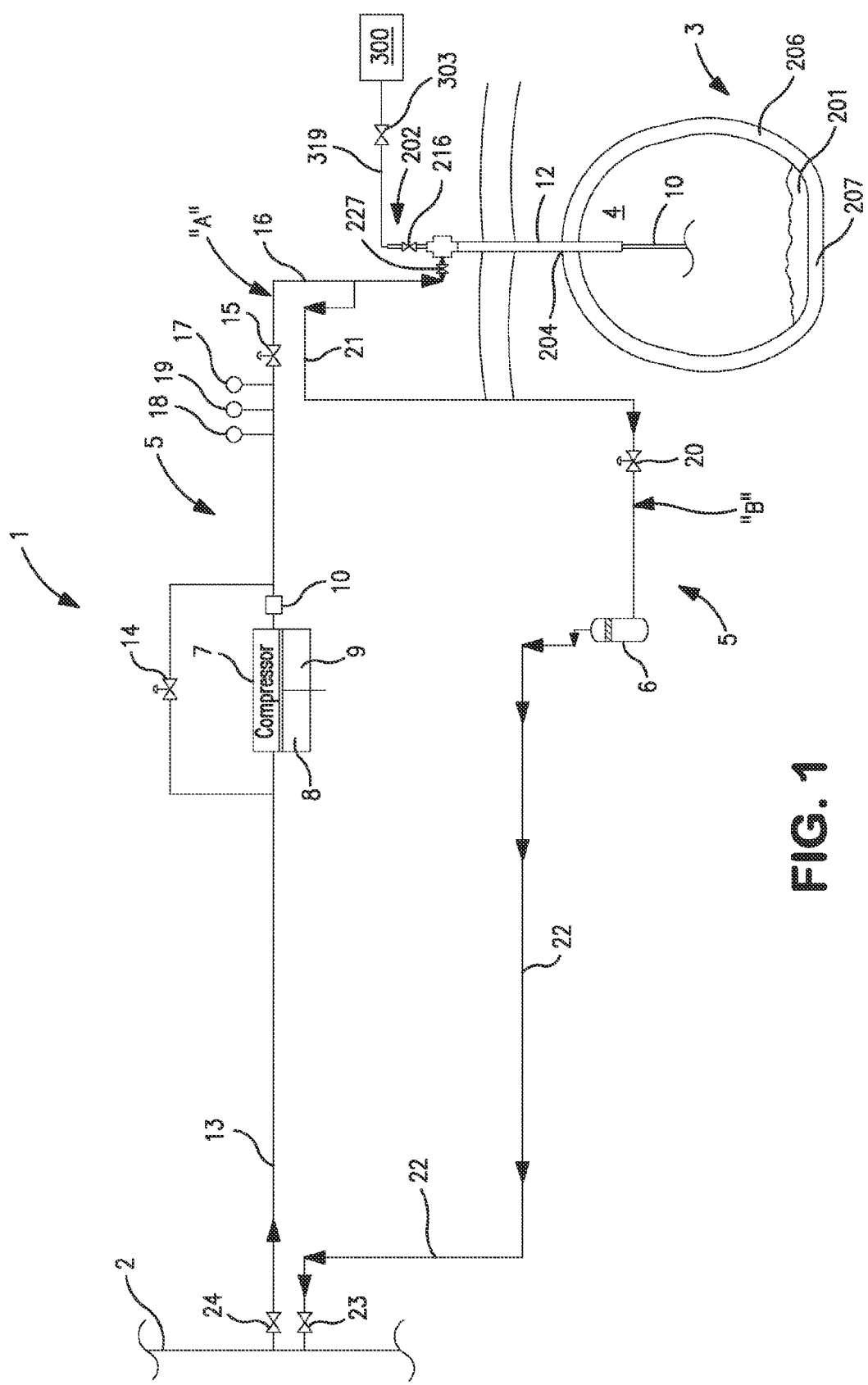
FIG. 1 shows a fragmentary schematic of a protocol for introducing and storing hydrogen to a hydrogen pipeline incorporating the principles of the invention.

As used herein, all concentrations are expressed as volumetric percentages. With reference to FIG. 1, a hydrogen storage and processing facility 1 is illustrated that is designed to remove hydrogen product from a hydrogen pipeline 2 during periods of low customer demand and store such hydrogen product within a salt cavern 3 as stored hydrogen 4. During periods at which demand for the hydrogen product exceeds the capabilities of the hydrogen pipeline 2 to supply hydrogen product to customers, stored hydrogen 4 can be removed from the salt cavern 3 and reintroduced into the hydrogen pipeline 2. In a manner that will be discussed, a substantially impermeable permeation barrier within the salt cavern 3 can be formed and continuously maintained for storing hydrogen product. The ability to store hydrogen product within such a salt cavern 3 having a substantially impermeable permeation barrier can advantageously produce a substantially leak-tight salt cavern not prone to seepage of stored hydrogen product through the salt cavern walls, as typically occurs with conventional salt caverns. The term "permeation barrier" as used herein is intended to refer to the walls of the salt cavern that when pressurized and/or thermally activated, restricts the passage of hydrogen flow. As a result, there is a reduction in the size and/or the quantity of interconnected pores or voids within the walls of the salt cavern that allow the permeation of hydrogen gas molecules into the wall or contaminant gas molecules through the wall. Accordingly, this reduction in the size and/or quantity of interconnected pores or voids substantially minimizes or prevents the availability of flow paths for high purity hydrogen molecules, preferably of at least 95% purity and above, from escaping therein and thereafter through the surrounding rock salt of the salt cavern.

As known in the art, salt cavern 3 is formed by solution mining in which water is injected through a pipe known as a brine string 10. The water dissolves the salt, and the resulting brine during the mining operation is returned through the annular space (not shown) formed in the final well casing 12 or other conduit between the inner wall of the final well casing 12 and the outer wall of the brine string 10. After the solution mining operation is complete, the residual brine in the salt cavern 3 can be removed through the brine string 10 by pressure displacement resulting from injection of hydrogen through the final casing 12 or other conduit. Once the brine level reaches the bottom of the brine string 10, a top section of the brine string 10 is sealed off by valve 216 and a residual brine layer 20, also known as a brine sump, may remain in the salt cavern 3 at the bottom portion 207.

The rock salt walls of the salt cavern deposit into thick layers over time. The deposited layers are gradually covered and buried by overburden sediments. The weight or pressure of such overburden sediments causes the salt formations to form densified structures, which tend to undergo viscoplastic slippage or deformation to create densified mircrocracks. Such slippage causes the grains of the salt to possess an inherent porosity, which is generally somewhat pervious to hydrogen. While the salt generally has low permeability and porosity rendering it impermeable to hydrocarbons, the salt is significantly more prone to hydrogen permeation by virtue of hydrogen's small atomic radius.

When customer demand for the hydrogen, supplied by hydrogen pipeline 2 is low or for any reason, production exceeds demand, a hydrogen stream 13 can be removed from the hydrogen pipeline 2 or alternatively received from another hydrogen production or storage source (not shown) and introduced into the salt cavern 3. "Hydrogen pipeline" or "hydrogen product pipeline" as used herein is intended to refer any conduit or passageway extending between the salt cavern 3 and the hydrogen production or storage source. In this regard, referring to FIG. 1, valve 24 is open to allow a portion of the product hydrogen in pipeline 2 to enter leg "A" of flow network 5. As used herein and in the claims, the term "legs" means flow paths within the flow network 5 that are formed by suitable conduits. Such conduits would be positioned to conduct the flow of the hydrogen streams within the flow network 5 as illustrated. Bypass valve 14 is set in a closed position, and valve 15 is set in an open position and valve 20 and valve 303 are set in a closed position to allow hydrogen stream 13 to be compressed in a hydrogen compressor 7 to produce a compressed hydrogen stream 16. Hydrogen compressor 7 can be any known compressor as used in the art, and is typically a compressor having a reciprocating piston. Hydrogen compressor 7 incorporates a first stage 8 and a second stage 9 in series with interstage cooling between stages and an aftercooler 10 which can be employed to remove the heat of compression. Alternatively, and as will be explained in greater detail below, the heat of compression can be transferred to the compressed hydrogen stream 16 when entering the salt cavern 3, as part of a thermal activation of the salt cavern 3. The compressor 7 is conventionally controlled to maintain the inlet pressure at a target suction pressure to maintain energy efficient operation of the compressor 7.

The compressed hydrogen stream 16 is introduced into the salt cavern 3 to form the stored hydrogen 4. The compressed hydrogen stream 16 continues to flow through the first leg "A". The compressed hydrogen stream 16 thereafter enters well-casing or conduit 12 (FIG. 2), which is connected to a transfer well head assembly 202, and thereafter into an annular flow area (not shown) within final well casing 12 (between the inside of final well casing 12 and brine string 10) from which the compressed hydrogen feed stream 16 enters salt cavern 3. Flow orifice meter 17, pressure transmitter 18 and temperature transmitter 19 can be used to determine the quantity of compressed hydrogen stream 16 that is introduced into the salt cavern 3.

Figure 2:
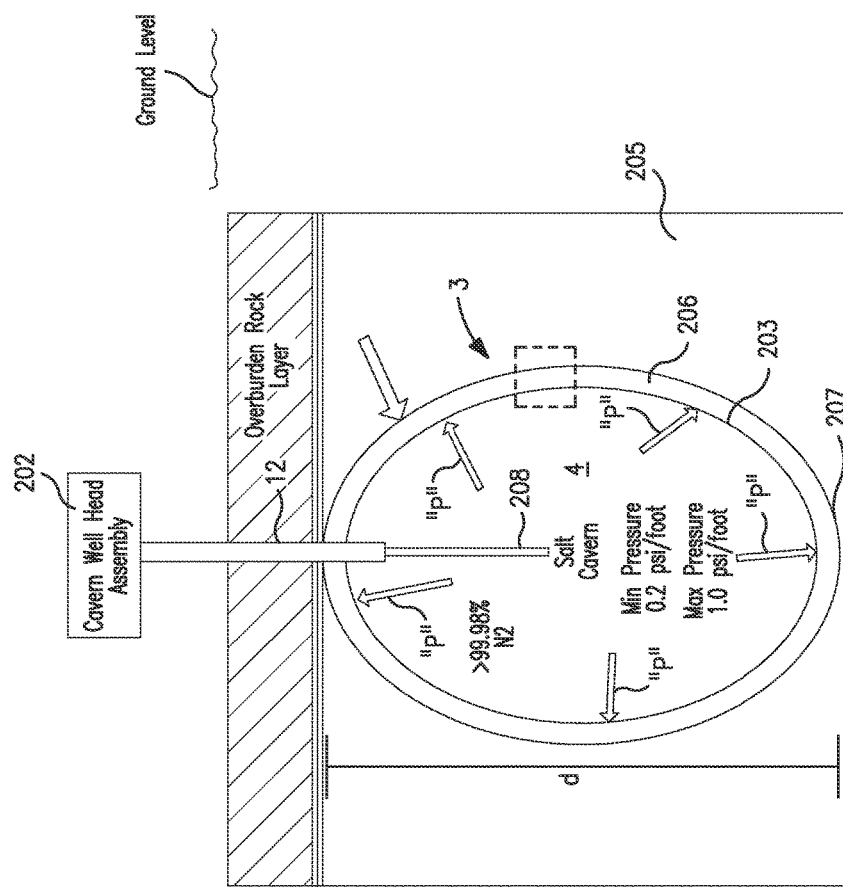
FIG. 2 shows a salt cavern having a substantially impermeable permeation barrier.

FIG. 2 shows the cavern 3 of FIG. 1 in isolation. The pressure of the stored hydrogen 4 exerts a pressure, denoted as "P", against the walls 203 of the salt cavern 3. The cavern depth that starts at the top of the salt and ends at the bottom of the salt cavity is denoted as "d" and is defined as the vertical distance spanning from the top-most portion 204 to the bottom-most portion 207 of the salt cavern 3. The pressure exerted by the stored hydrogen 4 against the salt cavern walls 203 is maintained above a lower threshold limit and below an upper threshold limit such that there is a reduction in the size and the quantity of interconnected pores or voids within the walls 203 of the salt to form a substantially impermeable permeation barrier 206. FIG. 2 shows that the substantially impermeable permeation barrier 206 extends along the entire edge or boundary of the cavern 3. The substantially impermeable permeation barrier 206 formed along the salt cavern walls has a reduced amount of interconnected porosity such that there are few or virtually no pathways for hydrogen to diffuse therethrough. The substantially impermeable permeation barrier 206 as defined herein substantially prevents all of the molecules of the stored hydrogen 4 from passing therethrough and seeping into the rock salt 205, as shown in FIG. 2. It should be understood that the substantially impermeable permeation barrier 206 in FIGS. 1 and 2 is shown as having a finite thickness only for purposes of illustrating the principles of the present invention. In addition, not maintaining the pressure between a lower threshold limit and an upper threshold limit for short periods of time in commercial operation is not believed to have deleterious effects on the maintenance of the barrier, and as such is contemplated by the present invention.

The lower limit has been found by the inventors to be greater than about 0.2 psi per liner foot of cavern depth. In this example, at a cavern depth of about 2500 feet as shown in FIG. 2, the minimum pressure must be maintained at greater than about 500 psig to allow formation of the substantially impermeable permeation barrier 206. In a preferred embodiment, the minimum pressure may be regulated so as to counteract the tendency of the salt cavern 3 to undergo creep closure, which occurs when the overburden cavern pressures are greater than the pressure within the cavern which causes the salt cavern 3 to close in and reduce the overall physical storage volume. Unlike the prior art, the present invention eliminates permeability of the salt cavern but still allows for counterbalancing of the creep closure.

Although maintaining the cavern 3 at a pressure exceeding the lower limit is advantageous, the inventors have also discovered an upper limit for pressure which cannot be exceeded. The upper limit has been found to be less than about 1 psi per liner foot of cavern depth. In this example, at a cavern depth of about 2500 feet as shown in FIG. 2, the maximum pressure must be maintained at a pressure lower than 2500 psig to allow for proper maintenance of the substantially impermeable permeation barrier 206. Exceeding the upper limit can cause the salt walls 203 to fracture, thereby causing the stored hydrogen 4 to flow upward through the fractures into the rock salt 205 and eventually to the surface, which could cause a potential safety hazard if the proper conditions existed such that the released hydrogen ignited.

Exploded views of a portion of the substantially impermeable permeation barrier 206 in FIG. 2 that is circumscribed by the rectangular dotted region is illustrated in FIGS. 4A-4C under three different cavern pressure scenarios. FIG. 4A shows that when the stored hydrogen 4 is maintained in the cavern 3 at a pressure substantially less than 0.2 psi per foot of cavern depth, hydrogen seepage occurs across the salt walls 203. FIG. 4A indicates that the porosity or voids along at least certain portions of the salt walls 203 are marginally large enough to allow availability of hydrogen molecules to flow therethrough. Such a scenario is representative of the stored hydrogen 4 being stored below the lower limit.

FIG. 4C, on the other hand, is indicative of one or more cracks or fractures along the salt walls 203 which can potentially form when the stored hydrogen 4 is maintained in the cavern 3 at a pressure substantially greater than about 1 psi per foot of cavern depth. The cracks are sufficiently large to allow hydrogen to leak therethrough. By way of comparison, the hydrogen leakage across the salt walls 203 occurs at a higher flow rate than the hydrogen seepage in FIG. 4A by virtue of the cracks creating larger flow paths. The scenario of FIG. 4C is representative of the stored hydrogen 4 being stored above the upper limit.

FIG. 4B shows successful formation of the substantially impermeable permeation barrier 206 in which molecules of the stored hydrogen 4 remain entirely confined within the interior volume of the salt cavern 3. FIG. 4B shows that the stored hydrogen 4 is maintained in the cavern 3 at a pressure greater than 0.2 psi per foot of cavern depth but less than 1 psi per foot of cavern depth. The substantially impermeable permeation barrier 206 creates a reduction in the size and quantity of interconnected pores or voids within the salt walls 203, thereby reducing or preventing the availability of flow paths for high purity hydrogen molecules from escaping the interior volume of the salt cavern 3.

In a preferred embodiment, the stored hydrogen 4 can be maintained in a pressure range that can vary between 0.4 to 0.8 psi per liner foot of cavern depth to form and maintain a substantially impermeable permeation barrier 206 that can confine the stored hydrogen 4 within the walls 203 of the salt cavern 3. The substantially impermeable permeation barrier 206 is formed by reducing the porosity of the cavern walls sufficiently enough to prevent the passage of high purity hydrogen molecules. In a preferred embodiment, the salt cavern 3 can be stored with 99.99% pure hydrogen gas without detectable seepage through the barrier 206.

Effectiveness of the substantially impermeable permeation barrier 206 can be assessed with pressure and temperature measurements. For instance, a pressure measurement is made in the cavern 3 by a downhole pressure transducer 208 to ensure the proper pressure range is maintained. Alternatively, a local cavern wellhead surface pressure measurement device (not shown), which may be located within the cavern wellhead assembly 202, can be employed for measuring pressure. The pressure transducer 208 extends through the well-casing or conduit 12 of the cavern well head assembly 202.

Alternatively or in addition to pressure gauges, one or more temperature gauges are placed at various locations within the interior volume of the salt cavern 3 to monitor the integrity of the substantially impermeable permeation barrier 206. For example, a downhole temperature gauge can extend through the conduit 12 and be positioned at a predetermined location within the stored hydrogen 4. Because hydrogen displays a negative Joule-Thompson coefficient, any seepage of the stored hydrogen 4 through walls 203 will manifest itself as a localized temperature excursion. Estimated temperature excursions as a result of seepage of hydrogen leakage have been observed to be on the order of 4° F. for pressure loss of and about 1200 psi in the cavern 3.

Generally speaking, if it is determined that leakage is occurring through the cavern 3, the pressure of the stored hydrogen 4 can be adjusted as needed to form a substantially impermeable permeation barrier 206 that is less prone to leakage of the stored hydrogen 4 therethrough. For example, if the downhole pressure transducer 208 shows that the pressure in the cavern 3 has exceeded the upper limit, a portion of the stored hydrogen 4 can be withdrawn from cavern 3 until the pressure falls to below the upper limit. Alternatively, if the downhole pressure transducer 208 indicates that the pressure in the cavern 3 has fallen below the lower limit, a portion of the hydrogen product from the pipeline 2 can be introduced into the cavern 3 until the pressure of the cavern 3 increases to at least slightly above the lower limit. As a result, a critical mass of stored hydrogen 4 is always kept in cavern 3 to maintain the substantially impermeable permeation barrier 206.

Large swings in customer demand for hydrogen product from the hydrogen pipeline 2 can significantly alter the amount of stored hydrogen 4 required to be withdrawn from the cavern 3 and directed to the hydrogen pipeline 2. This in turn increases the variation in pressure in the cavern 3. The pressure in the cavern 3 may vary to the extent that the pressure falls outside the predetermined upper and lower limits for short periods of time. As a result, real-time adjustments are performed to ensure that the substantially impermeable permeation barrier 206 to the stored hydrogen 4 is restored during operation of the cavern 3.

For instance, when customer demand is below production capabilities, or, for any reason, demand may fall below production, the cavern pressure may exceed the upper limit as a result of an increased amount of hydrogen product from the pipeline 2 being introduced into the cavern 3. The present invention may utilize one or more downhole temperature and pressure gauges 501 and 208 (FIGS. 2 and 5) to detect that the pressure of the stored hydrogen 4 has exceeded an upper limit for short periods of time. After measuring and detecting the elevated pressure, at least a portion of the stored hydrogen 4 from the cavern 3 can be withdrawn and returned to the hydrogen product pipeline 2. Referring to FIG. 1, valve 20 would be opened to allow a portion of the stored hydrogen 4 to be discharged from the cavern 3 as a crude hydrogen stream 21. Because the pressure of the stored hydrogen 4 is higher than that of the pipeline 2 in this particular example, the crude hydrogen stream 21 readily flows through the second leg "B" of flow network 5. A sufficient amount of stored hydrogen 4 can be withdrawn so that the pressure of the stored hydrogen 4 remaining in the cavern 3 falls below the upper limit. As the pressure decreases below the upper limit, the pressure in the cavern is insufficient to have a tendency to fracture the walls 203 of the salt cavern 3, and a substantially impermeable permeation barrier 206 is re-established along the walls 203 of the cavern 3. When the appropriate amount of stored hydrogen 4 has been removed, valve 20 is closed to isolate the cavern 3. Cavern pressure and temperature can be monitored to ensure that the substantially impermeable permeation barrier 206 remains within the predetermined lower and upper limits.

In another scenario, customer demand may fall below production capabilities, or, for any reason, demand may fall below production, such that a real-time analysis of the cavern pressure indicates that the pressure is trending upwards and approaching the upper limit. After detecting the upward trend and in response thereto, at least a portion of the stored hydrogen 4 can be withdrawn to the hydrogen product pipeline 2. Withdrawal of stored hydrogen 4 continues until the pressure of the stored hydrogen 4 is considered to fall below the upper limit. In one example, withdrawal of the stored hydrogen 4 continues until the pressure is determined to be sufficiently below the upper limit, such that the inherent pressure fluctuation of the stored hydrogen 4 in the cavern 3 does not exceed the upper limit. This downward adjustment in pressure allows the substantially impermeable permeation barrier 206 to the stored hydrogen 4 to be maintained.

During the operation of the salt cavern 3, there may be instances when customer demand may be greater than the supply of the hydrogen in the product pipeline 2, or, for any reason, demand exceeds production of hydrogen. As a result, the pressure of the stored hydrogen 4 may fall below the lower limit for short periods of time. In response to such measurement and detection, a portion of hydrogen product from the hydrogen product pipeline 2 can be introduced from the hydrogen pipeline 2 into the salt cavern 3 to increase the pressure of the stored hydrogen 3 above the lower limit. Referring to FIG. 1, valve 24 is set in the open position and bypass valve 14 is set in the open position, as the pressure in the pipeline 2 in this particular example is sufficient for the hydrogen product to free flow along leg "A" without requiring pressurization by compressor 7. Valve 15 is opened and valve 20 is closed. The hydrogen product introduced into the cavern 3 increases the pressure in the cavern 3 that is exerted against the walls 203 of the cavern 3. The porosity of the walls 203 of salt cavern 3 is partially compressed, which in turn reduces the voids and/or grain boundaries of the salt walls 203 to a size substantially small enough to prevent the stored hydrogen 4 from passing therethrough. Cavern pressure and temperature can be monitored to ensure that the substantially impermeable permeation barrier 206 is adequate. When the appropriate amount of hydrogen product from the pipeline 2 has been introduced into the cavern 3, valve 15 is closed to isolate the cavern 3. As the pressure in the cavern 3 increases above the lower limit, the pressure is sufficient to have a tendency to counteract creep closure of the walls 203 of the salt cavern 3, and a substantially impermeable permeation barrier 206 to the stored hydrogen 4 is re-established along the walls 203 of the cavern 3.

Still further, customer demand can be greater than the supply of the hydrogen in the product pipeline 2, or, for any reason, demand exceeds production of hydrogen such that a real-time analysis of the pressure indicates that the pressure is trending downwards and approaching the lower limit. After detecting the downward trend and in response thereto, a portion of the hydrogen product from the hydrogen pipeline 2 can be introduced into the salt cavern 3 until the pressure of the stored hydrogen 4 within the cavern 3 is determined to increase above the lower limit. In one example, hydrogen product from the hydrogen pipeline 2 continues to be introduced into the cavern 3 until the pressure in the cavern 3 increases sufficiently above the lower limit, such that inherent pressure fluctuation in the stored hydrogen 4 does not fall below the lower limit. This upward adjustment in pressure therefore allows the substantially impermeable permeation barrier 206 to the stored hydrogen 4 to be maintained.

Figure 3:
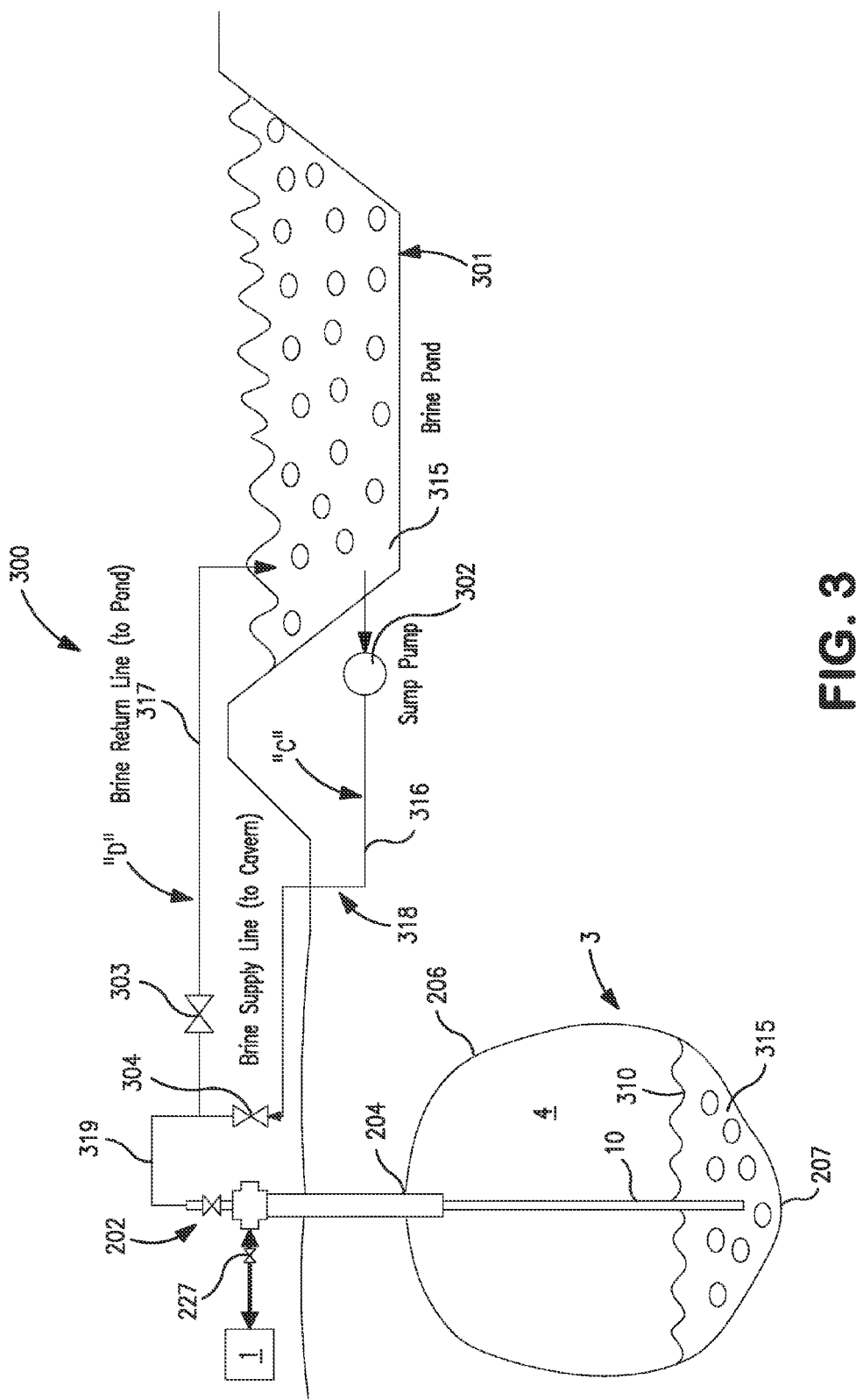
FIG. 3 shows a brine pond reservoir for providing brine into the salt cavern of FIG. 2 as needed to increase the cavern pressure to a predetermined pressure threshold for maintaining the substantially impermeable permeation barrier.

In an alternative embodiment, there will be instances when a hydrogen generation facility is taken off-line or when demand for hydrogen by customers otherwise exceeds the available production capabilities, either of which necessitates removal of substantially all of the stored hydrogen 4 from the salt cavern 3. In such a case, the cavern 3 can approach a hydrogen depleted state for a sustained period of time during operation of the cavern 3. A cavern in a "hydrogen depleted state" as defined herein refers to a cavern containing an insufficient quantity of hydrogen such that the cavern pressure is below the lower limit as defined herein for a sustained period of time. In one example, the hydrogen depleted state may be about 50-90% below the lower limit. In order to maintain the substantially impermeable permeation barrier 206, fluid can be temporarily introduced into the salt cavern 3 to maintain the pressure in the cavern 3 necessary for the substantially impermeable permeation barrier 206. The term "fluid" as used herein is intended to cover either a gas phase, liquid phase or a combination thereof. FIG. 3 describes one possible embodiment of a brine pond system 300 for achieving continued maintenance of the substantially impermeable permeation barrier 206. Brine 315 from a brine pond reservoir 301 can be introduced into the salt cavern 3 so as to occupy the depleted cavern 3. The brine pond system 300 includes a reservoir 301 and sump pump 302 for transporting brine 302 into the salt cavern 3 as needed to increase the cavern pressure beyond the lower limit for maintaining the substantially impermeable permeation barrier 206. The brine pond 300 also includes a flow network 318 consisting of a discharge leg "C", a return leg "D", valve 303 and valve 304. The flow network 318 allows the brine 315 to be transported to the salt cavern 3 through leg "C" and returned thereafter back into the brine pond 301 through leg "D".

In operation, brine 315 exits from the bottom of the brine pond reservoir 301 utilizing sump pump 302, which pressurizes and transports the brine 315 along flow leg "C" as brine stream 316. Valve 303 is closed, and valve 304 is set in the open position to allow the brine stream 316 to flow through a conduit 319 connected to the transfer well head valve 202 and thereafter into an annular flow area (not shown) within final well casing 12 (between the inside of final well casing 12 and brine string 10) from which the brine stream 316 enters salt cavern 3.

The brine 315 occupies the bottom portion 207 of the cavern 3. As a result, the usable volume of the cavern 3 is reduced. The reduction in volume of the salt cavern 3 allows for the remaining stored hydrogen 4 contained in the interior volume of the cavern 3 to occupy a smaller storage volume, thereby increasing the pressure of the cavern 3. Brine 315 continues to enter salt cavern 3 through brine string 10 until downhole pressure transducer 208 detects that the cavern pressure has reached above the lower limit. Alternatively, wellhead pressure measuring devices (not shown), which may be located within the cavern wellhead assembly 202, can be utilized to detect cavern pressure. When the desired caver pressure is detected, valve 304 can be closed to isolate the cavern 3. In the manner described herein, the substantially impermeable permeation barrier 206 can be maintained, even though the cavern 3 has been depleted of hydrogen.

Other variations are possible and are within the scope of the present invention. For instance, the brine 315 may be introduced into the cavern 3 so as to displace the stored hydrogen 4 therein. As pressurized brine 315 enters brine string 315, the stored hydrogen 4 can be displaced upwards through the annular space of the well casing 12 as a crude hydrogen stream. In other words, the driving force for displacing the stored hydrogen 4 is provided by the pressurized brine 315 entering downwards into the cavern 3 through the brine string 10. Well head valve 227 is set in an open position to enable the crude hydrogen stream to enter the hydrogen storage and processing facility 1 shown in FIG. 1. The crude hydrogen is discharged as a crude hydrogen stream 21. The crude hydrogen stream 21 readily flows through the second leg "B" of flow network 5 and is exported into the product pipeline 2 with valve 23 set in the open position. In still another variation, not all of the stored hydrogen 4 need be removed. Brine 315 can be injected into the cavern 3 as described above so as to establish a specific cavern pressure in between the lower pressure threshold and the upper pressure threshold to maintain the substantially impermeable permeation barrier. The addition of brine 315 occupies the bottom portion 207 of cavern 3 (FIG. 3) and reduces the effective volume of the stored hydrogen 4 contained therein. The reduction in volume compresses the stored hydrogen 4, thereby increasing the cavern pressure to the desired pressure level that is within the lower and upper limits. In this manner, substantially impermeable permeation barrier 206 can be effectively formed and maintained.

When a sufficient amount of product hydrogen from the product pipeline 2 is to be stored in hydrogen cavern 3, as may occur, for example, as a result of hydrogen production exceeding customer demand, the brine 315 within the salt cavern 3 can be returned to the brine pond 301. In a preferred embodiment, product hydrogen is drawn off from the pipeline 2, compressed and injected into the cavern 3. Compression by compressor 7 ensures that the product hydrogen stream has sufficient driving force to displace the brine 315 from out of the cavern 3 into return leg "D" of flow network 318 (FIG. 3). Valve 24 (FIG. 1) is open to allow a portion of the product hydrogen in pipeline 2 to enter leg "A" of flow network 5 as hydrogen product stream 13. Valve 20 is closed, and bypass valve 14 is set in a closed position to allow the hydrogen product stream 13 to be compressed by compressor 7 to form a compressed hydrogen product stream 16. Valve 15 is open to allow the compressed hydrogen product stream to flow through well casing 12 and thereafter enter cavern 3.

The compressed hydrogen stream 16 is introduced into the salt cavern 3 to form the stored hydrogen 4. The compressed hydrogen stream 16 continues to flow through the first leg "A". The compressed hydrogen stream 16 thereafter enters conduit 12 (FIG. 2), which is connected to a transfer well head assembly 202, and thereafter into an annular flow area (not shown) within final well casing 12 (between the inside of final well casing 12 and brine string 10) from which the compressed hydrogen feed stream 16 enters salt cavern 3. As the compressed hydrogen product enters salt cavern 3, the brine 315 stored therein is displaced upwards through the well casing 12. Valve 303 is opened, and valve 304 is closed to allow the brine 315 to flow as stream 317 through the return leg "D" of flow network 318 of the brine pond system 300 into the brine pond 301. A pump may be employed to pressurize brine stream 317, if necessary. In this manner, the return of the brine 315 to the brine pond 301 is possible.

As an alternative to the above described brine pond system 300, it should be understood that the present invention also contemplates permanently retaining a minimal amount of brine 315 along the bottom portion 207 of the cavern 3 so that brine 315 does not need to be transported to and from a brine pond 301. The preferred amount of brine 315 to be permanently retained at the bottom portion 207 of the cavern 3 would be that amount which is equivalent to reduce the effective hydrogen storage volume of the cavern 3 such that the compression of the cavern volume is always pressurized slightly above the lower limit pressure threshold. In such an embodiment of the present invention, only the upper limit for the cavern pressure threshold would need to be regulated to ensure formation of the substantially impermeable permeation barrier 206 without fracture of the salt walls 203. Cavern pressure and temperature can be monitored with suitable instrumentation as has been described to ensure that the substantially impermeable permeation barrier 206 at the lower limit is being maintained by the brine 315 and at the upper limit by introduction of hydrogen from the pipeline 2.

Other techniques for forming and maintaining the substantially impermeable permeation barrier 206 of the salt cavern 3 are contemplated. For example, a controlled amount of heat can be imparted to the salt walls 203 to cause the walls 203 to attain a state of plasticity in which a portion of the walls 203 begin to move, thus closing and sealing any pores, voids and/or microfractures within the salt walls 203. The amount of heat that gets transferred from the compressed hydrogen stream 16 to the walls 203 can vary, depending upon the crystal and grain structure of the salt walls 203, the composition of the salt itself and other operating factors, such as the quantity of residual brine remaining in the cavern 3 and from the throttling of the aftercooler 10. Preferably, the amount of heat needed to sufficiently produce a rise in the temperature in the cavern 3 at a particular depth of cavern 3 should be greater than the natural geothermal temperature gradient of the earth that corresponds to the particular depth of cavern 3. The amount of temperature rise needed to create this sealing mechanism and drive the salt to a more plastic physical state may be about 0.1° F./linear foot of depth of the cavern 3, denoted as "d" of FIG. 2, or 250° F. for the cavern being referenced in this embodiment. The portions of the walls 203 can become fluid-like when heated by the hydrogen stream 16 to fill in at least a portion of the porous walls 203, thereby creating a more densified wall 203 that is less permeable to the flow of stored hydrogen 4 therethrough. The temperature of compressed hydrogen stream 16 can be modulated by controlling the rate of cooling from the aftercoolers 10 situated downstream of the compressor 7. In one example, the temperature of the compressed hydrogen stream 16 can be controlled to be greater than 200° F., but less than about 400° F., by momentarily shutting off the aftercoolers 10 for a predetermined time. As the hotter hydrogen stream 16 is introduced into the cavern 3, it contacts the cooler walls 203, thereby heating the cooler walls 203. A portion of the walls 203 is heated and can become sufficiently plastic-like to enable filling in of some of the porous material, thereby altering the microstructure of the salt walls 203. In particular, the temperature of the salt walls 203 increases as heat diffuses therein. The heating causes grains to combine with each other. As a result, the grain sizes are increased, and the number of grain boundaries decrease. The reduction in grain boundaries creates fewer diffusion pathways for the stored hydrogen 4. A less porous structure is thereby created in which the number of pores and size of the pores of the walls 203 can both be decreased. This transfer of heat from the compressed hot hydrogen stream 16 to the salt walls 203 can potentially reduce the impact of stress dilation and micro fracturing of the salt 203, thereby strengthening and improving the properties of the substantially impermeable permeation barrier 206. Such a temperature treatment to the cavern 3 can be conducted one or more times as needed to suitably alter the grain microstructure of the salt walls 203.

In an alternative embodiment, a method for enhancing confinement of the stored hydrogen within the substantially impermeable permeation barrier 206 of the salt cavern 3 can be achieved by ensuring an adequate seal between the casing 12 and cavern 3 is maintained during the service life of the salt cavern 3. The casing 12 is generally made of steel or steel alloy such as carbon steel. The casing 12 is typically cemented into position and forms a seal with the top portion of 204 of the cavern 3. However, exposure to hydrogen can cause the steel or steel alloyed casing 12 to undergo hydrogen embrittlement. Mechanical stress in casing 12 due to hydrogen embrittlement can reduce the ductility of the casing 12, which can lead to brittle failure of the casing 12, thus creating residual stresses. The residual stresses within the casing 12 can be high enough to push against the top portion 204 and potentially create gaps that destroy the seal between casing 12 and the top portion 204 of the cavern 3. The gaps create a flow path for the stored hydrogen 4 to exit therethrough. As such, the structural integrity of the cavern 3 is compromised and the cavern 3 can become inoperable.

To counteract hydrogen embrittlement, hydrogen product that is removed from the pipeline 2 for storage in the cavern 3 can be compressed by compressor 7 to produce compressed hydrogen stream 16. However, rather than remove the heat of compression, all of the heat of compression or a substantial portion of the heat of compression is maintained within the compressed hydrogen stream 16 by regulating the after cooling rate of the compressed stream 16 through various heat exchange equipment (i.e., after coolers, fin fans, or other suitable means as known in the art). For example, an after cooler 10 situated downstream of the compressor 7 as shown in FIG. 1 can be throttled to manipulate the temperature of the compressed hydrogen stream 16 so that all of the heat of compression or a substantial portion of the heat of compression is maintained within stream 16.

As the compressed hydrogen stream 16 flows through the well casing 12, a sufficient amount of heat is transferred to the steel or steel alloyed casing 12 and increases the temperature of the well casing 12 a sufficient amount to both increase the ductility of the casing 12 and suppress the onset of hydrogen embrittlement along the casing. It should be understood that the term "suppress" as used herein means a reduction or delay of hydrogen embrittlement. The heated temperature of the well casing 12 can vary depending on the particular steel alloys utilized. In a preferred embodiment, the well casing is carbon steel which is heated to a temperature from about 200° F. to about 400° F.

In this manner, the seal between the casing 12 and the cavern 3 remains structurally in-tact during the service life of the cavern 3 to improve confinement of the stored hydrogen 4 by the elimination or substantial reduction of hydrogen leakage through gaps between the casing 12 and the top portion 204 of the cavern 3.

It should be understood that various modifications to the present invention are contemplated without departing from the spirit and scope of the present invention. For example, a portion of the hydrogen product that is removed from a pipeline 2 may be sufficiently pressurized, thereby eliminating a need for its compression. Particularly, a portion of the hydrogen product that is removed from the hydrogen pipeline 2 can bypass the compressor 7, and thereafter be introduced into the salt cavern 3. As the pressure in the cavern 3 increases and begins to deviate from predetermined compression requirements (e.g., pressure in the cavern 3 approaches or exceeds the pressure in the hydrogen pipeline 2), additional hydrogen product which is removed from the hydrogen pipeline 2 may require pressurization and can therefore be compressed by the compressor 7 prior to its introduction into the salt cavern 3. Additionally, it should be understood that stored hydrogen 4 can be withdrawn from the cavern 3 and re-routed to the compressor 7, if required to pressurize the withdrawn hydrogen to a sufficient pressure equal to or greater than the pressure of the pipeline 2. In this manner, the compressor 7 can be selectively utilized to introduce hydrogen product into the cavern 3 and withdraw stored hydrogen 4 from the cavern 3, as necessary during operation of the cavern 3. Additionally, the introduction and withdrawal of brine or other gases into the cavern 3 for preferably reducing the effective volume of the cavern 3 may also occur in a similar manner.

While the present invention has been described in relation to the ability to store hydrogen at purity grades of preferably about 95% and higher, it should be understood that the principles of the present invention also are applicable to storage of lower purity grades of hydrogen (i.e., below 95% purity) as well as other non-hydrogen containing gases, including inert gases, and any combination thereof. In addition to confinement, the present invention can substantially reduce permeation of contaminants from the walls of the salt cavern 3 into the stored gas, thereby mitigating concerns of contamination typically encountered when maintaining stored gas within conventional salt caverns. The ability to reduce contamination of the stored gas may in some instances eliminate the need for implementation of purification equipment upon withdrawal of the stored gas from the salt cavern 3. As a result, the present invention offers a process benefit of substantial reduction in cost and complexity of operating the salt cavern 3. Still further, hydrogen product may be removed from various hydrogen sources. By way of example, hydrogen product may be removed from a hydrogen production source, such as one or more stream methane reformers, and thereafter introduced by a hydrogen pipeline into the salt cavern 3. In another example, the hydrogen product may be removed from a hydrogen recovery plant and directed by a hydrogen pipeline into the salt cavern 3. Alternatively, hydrogen product may be removed from any type of hydrogen storage source and routed by a hydrogen pipeline into the salt cavern 3.

EXAMPLE

Figure 5B:
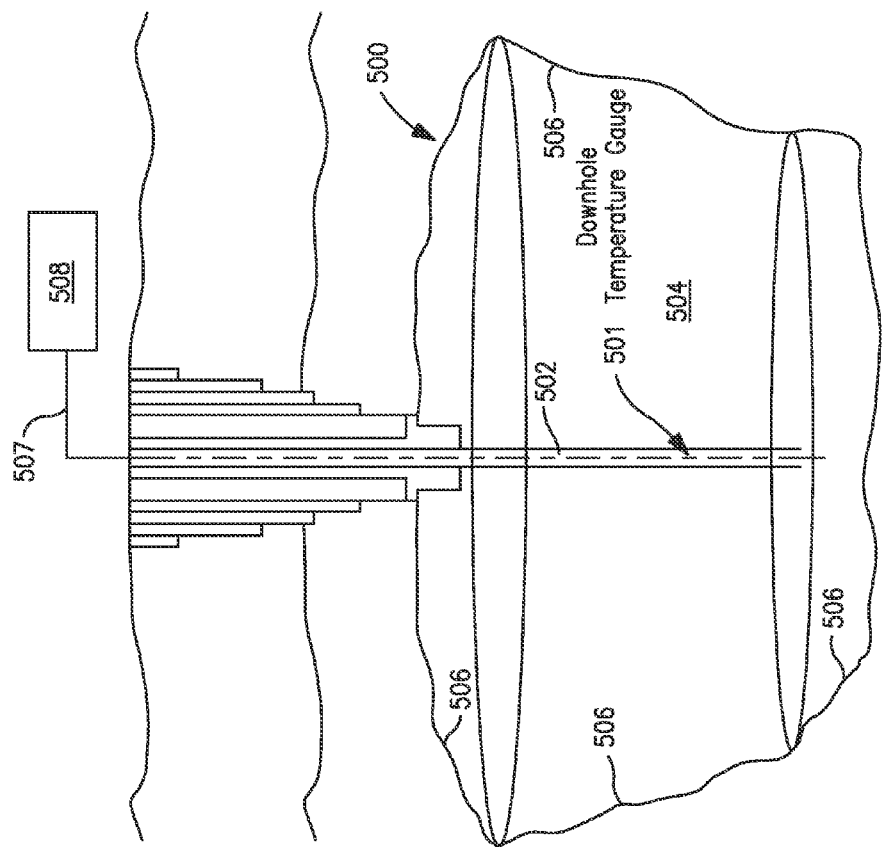
FIG. 5b shows a leakage detection system that can be employed during the mechanical integrity verification of the salt cavern.

A mechanical integrity test was conducted to evaluate and verify the structural integrity of a salt cavern for storing hydrogen in accordance with the principles of the present invention. FIG. 5b shows the test-setup. A gaseous hydrogen stream was withdrawn from hydrogen pipeline, compressed and then injected into the cavern 3 as a compressed stored hydrogen 504, in a similar manner as described in FIG. 1. A pressure transducer (e.g., as shown in FIG. 2) was used to monitor and regulate the pressure of the stored hydrogen 504 to ensure that the pressure was maintained above the minimum limit but below the upper limit. As a result, a substantially impermeable permeation barrier 506 was formed and maintained throughout the mechanical integrity test. FIG. 5 shows that the substantially impermeable permeation barrier 506 extended continuously along the walls of the cavern 500.

Figure 5A:
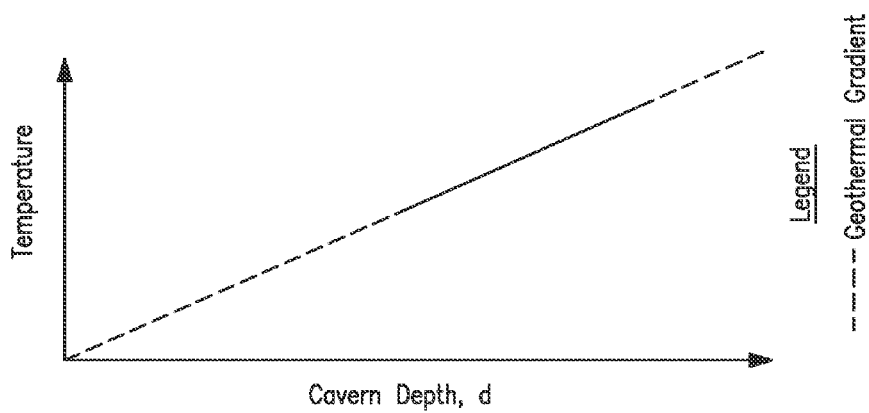
FIG. 5a shows a geothermal temperature profile generated during a mechanical integrity test.

Downhole retractable temperature gauges and instrumentation were inserted into the cavern 3 at various depths to generate a temperature profile gradient as a function of cavern depth, "d" (shown in FIG. 5a). The temperature gauges were also utilized to detect leakage of hydrogen on the basis of any temperature excursions in the cavern 500. The temperature excursions occur because hydrogen has a negative Joule-Thompson coefficient upon volume expansion. FIG. 5 shows one of the temperature gauges 501 that were inserted through well casing 502 within the interior volume of salt cavern 500. The temperature gauge 501 and the other gauges (not shown, for purposes of clarity) were calibrated to accurately and precisely detect temperature excursions on the order of 0.01° F. or more. Placement of the temperature gauges at different depths within the cavern 3 allowed for the capability to detect localized leaks, including those from the well casing 502. The output signal 507 from the temperature gauge 501 and others (not shown) were coupled to an active control system 508 configured to close the cavern's emergency shutdown valves located within cavern wellhead assembly 202 (FIG. 2), if necessary, as a result of leakage detection. Accompanying high temperature alarms were programmed into the control system 507. Similarly, alarms for low and high pressure limits were programmed into control system 508. The temperature gauges utilized in the test provided accuracy within plus/minus 0.1° F., and the pressure gauge utilized in the test provided accuracy to within plus/minus 0.05%.

The pressure and temperature readings were compiled for 72 continuous hours. The downhole pressure and temperature readings obtained at a depth of 50% of the cavern depth, d, were employed to calculate the volume of stored hydrogen 504 within the salt cavern 500 at the start of the test and at the conclusion of the test. Any measurement error, as indicated by the inherent accuracy and precision of the temperature pressure gauges and instrumentation, were factored into the gas volume computation. The results indicated that the volume of stored hydrogen 504 at the start of the test was equal to the total volume of stored hydrogen 504 at the end of the test. Further, the temperature profile gradient shown in FIG. 5 was linear and did not exhibit any discernible temperature excursions. The results supported the conclusion that the substantially impermeable permeation barrier 506 was formed and maintained during the 72 hours test window.

The ability of the present invention to store ultrahigh purity hydrogen without volume losses of the stored product is an improvement over conventional storage methods. Furthermore, the substantially impermeable permeation barrier reduces seepage and leakage of the hydrocarbon contaminants from the salt walls 203 into the stored hydrogen volume, potentially reducing the costs associated with implementing suitable purification equipment for the subsequent withdrawal of the stored hydrogen 4. For example, the required sizing of adsorption beds in the present invention would be potentially smaller than of conventional storage caverns, as less contaminants would be required to be removed upon withdrawal of the stored hydrogen 4 from salt cavern 3 to achieve a product purity specification. In conventional storage caverns, the inherent porosity of the salt walls 203 may contribute to introduction of a large amount of contaminants from the salt walls 203 into the interior of the cavern 3, thereby requiring larger purification units (e.g., adsorption units). Accordingly, the present invention offers a unique process benefit with respect to the amount of purification required when the stored hydrogen gas 4 is withdrawn from the cavern 3. Such a process benefit translates into a more cost effective hydrogen storage processing facility relative to conventional salt cavern hydrogen storage facilities.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A method for storing high purity hydrogen product in a salt cavern, the salt cavern containing walls characterized by a halite structure having a minimum purity of at least about 75% of sodium chloride, comprising:
    removing the high purity hydrogen product from a high purity hydrogen pipeline;
    compressing the high purity hydrogen product to produce a compressed high purity hydrogen product comprising a purity of 99% or greater;
    introducing the compressed high purity hydrogen product into the salt cavern to create a pressure between a predetermined lower limit and a predetermined upper limit within the salt cavern;
    maintaining the pressure within the salt cavern between the predetermined lower limit and the predetermined upper limit, wherein fluid is introduced into the salt cavern to increase the pressure within the salt cavern to at least the predetermined lower limit but below the predetermined upper limit, wherein the predetermined lower limit is 0.2 psi per linear foot of cavern depth and the predetermined upper limit is 1.0 psi per linear foot of cavern depth, wherein the cavern depth is defined as the vertical distance spanning from a top-most portion to a bottom-most portion of the salt cavern; and
    confining the high purity hydrogen product within the salt cavern.

2. The method of claim 1, wherein the predetermined lower limit is 0.4 psi per linear foot of cavern depth and the predetermined upper limit is 0.85 psi per linear foot of cavern depth.

3. The method of claim 1, wherein the step of maintaining the pressure includes withdrawing a portion of the high purity hydrogen product from the salt cavern.

4. The method of claim 1, exhibiting temperature excursions of less than 4° F. for pressure losses of less than 1200 psig in the salt cavern.

5. The method of claim 4, exhibiting no discernable temperature excursions.

6. The method of claim 1, further comprising the steps of:
    compiling pressure and temperature readings within the salt cavern for a test period of 72 hours;
    calculating the volume of high purity hydrogen product stored in the salt cavern and the volume of high purity hydrogen product within the salt cavern at the start of the test period to be equal to the volume of high purity hydrogen product in the salt cavern at the end of the test period.

7. The method of claim 6, exhibiting no discernable temperature excursions.

8. The method of claim 1, wherein the fluid comprises brine.

* * * * *